(12) United States Patent
Harris (10) Patent No.: US 7,615,900 B1
(45) Date of Patent: Nov. 10, 2009

(54) POWER GENERATOR FOR ELECTRONIC DEVICES

(75) Inventor: David L. Harris, Pleasanton, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 300 days.

(21) Appl. No.: 11/689,949

(22) Filed: Mar. 22, 2007

(51) Int. Cl.
*H02K 7/10* (2006.01)

(52) U.S. Cl. .............................. 310/81; 310/166; 310/12

(58) Field of Classification Search .................. 310/166, 310/12–15, 81; 320/101, 114; 290/1 R, 290/53
See application file for complete search history.

(56) References Cited

U.S. PATENT DOCUMENTS

| | | | | |
|---|---|---|---|---|
| 3,507,580 A | * | 4/1970 | Howard et al. | 417/231 |
| 4,032,829 A | * | 6/1977 | Schenavar | 322/3 |
| 4,500,827 A | * | 2/1985 | Merritt et al. | 322/3 |
| 5,254,931 A | * | 10/1993 | Martensson | 320/114 |
| 6,617,825 B2 | * | 9/2003 | Chu | 320/114 |
| 6,841,970 B2 | * | 1/2005 | Zabramny | 320/101 |
| 7,161,254 B1 | * | 1/2007 | Janky et al. | 290/1 R |
| 2003/0155827 A1 | * | 8/2003 | Cheung et al. | 310/90.5 |
| 2004/0251754 A1 | * | 12/2004 | Cibie | 310/81 |
| 2006/0139000 A1 | | 6/2006 | Bailey et al. | |

* cited by examiner

*Primary Examiner*—Thanh Lam (57) ABSTRACT

A power generator comprises a coil with having ends connected to electrical contacts, a magnet mounted on a slide rod placed surrounded by the coil and having a positive pole and a negative pole and configured to slide between the two ends of said rod to generate an electrical power in the coil by electromagnetic induction on movement of the magnet inside the coil, a first magnetic bumper located at a first end of the two ends of the slide rod and having a positive pole facing the positive pole of the magnet, a second magnetic bumper located at a second end of the two ends of the slide rod and having a negative pole facing the negative pole of the magnet, and an electronic interface circuit for converting an output power of said electrical contacts of the coil to a power input of an electronic device.

19 Claims, 6 Drawing Sheets

FIGURE 6
(SLICED IN HALF VIEW)

POWER GENERATOR FOR ELECTRONIC DEVICES

BACKGROUND OF THE INVENTION

1. Field of the Invention

This invention relates to the field of electronic devices, and more particularly, to power generators for electronic devices.

2. Description of the Prior Art

The uses of battery operated portable electronic devices like cell phones, hand held Personal Digital Assistants (PDA), MP3players, laptops and digital gaming devices are increasing every day in the modern world. Miniaturization has further revolutionized their design and portability. All these devices rely on a secondary power source from rechargeable batteries installed in them for portability. Rechargeable batteries with longer life and improved performance in respect of standby time and talk (or use) time, charging cycles are presently available. However, despite all such technological advances, it is a common and frustrating experience with the users of these devices, particularly the travelers and tourists, who are often cut-off from any primary power source to recharge the battery, the moment the charge in the battery flattens out the device is rendered useless.

Attempts have been made to solve this problem by harvesting solar energy through solar panels installed in the device like cell phone.

U.S. Pat. Nos. 6,504.340 and 6,977,479 and also U.S. published patent applications U.S. 20030128010A1, U.S. 20040204179A1, U.S. 20050225281A1, U.S. 20050162121A1 and U.S. 20060212994A1 have all disclosed harvesting of solar energy to charge a cell phone battery.

However, such solar powered charging devices have their own drawbacks. Firstly, a traveler normally wishes to keep the phone inside his pocket or purse that does not get the sun ray to energize the solar charger or may be he is moving in a transport without any access to the sun ray and thereby fails to harvest solar energy. Secondly, a dual powered device adds to its size and thus goes against the current trend for miniaturization.

Portable recharging units using rechargeable or non-rechargeable AA or AAA batteries are also available in the market but are not convenient or cost effective, as they need frequent recharging or battery replacement with limited capacity to charge the device battery only 2-3 times.

The published U.S. patent application with publication No. 2006/0139000 A1 discloses a wrist worn battery charging system to charge or power batteries for devices like cell phones, PDAs, laptops, MP3 players comprising a permanent magnet adapted to move back and forth on rails, surrounded by copper coils attached to an electronic circuitry comprising a battery interface for filtering output pulses with connecting cable that can be plugged into the charging point of a portable device. The back and forth movement of the permanent magnet caused by the wrist movement of the user helps to generate power in the surrounding coils through electromagnetic induction. While this appears to be the first attempt to harvest kinetic energy to generate electrical power for recharging hand held electronic devices, the present invention, as described herein, is a distinct improvement over the said prior art device that provides a pair of magnetic bumpers to ensure the oscillatory movement of a magnet within an induction coil even with small movement of the user carrying it which in turn ensures generation of steady output of electrical energy for recharging or powering a portable electronic device powered by a chargeable battery.

SUMMARY OF THE INVENTION

In an embodiment of the invention, a power generator comprises a coil having ends connected to electrical contacts, a magnet mounted on a slide rod surrounded by the coil and having a positive pole and a negative pole and configured to slide between two ends of said slide rod to generate an electrical power in the coil by electromagnetic induction on movement of the magnet inside the coil, a first magnetic bumper located at a first end of the two ends of the slide rod and having a positive pole facing the positive pole of the magnet and configured to repel the magnet on the movement of the magnet inside the coil, a second magnetic bumper located at a second end of the two ends of the slide rod and having a negative pole facing the negative pole of the magnet and configured to repel the magnet on the movement of the magnet inside the coil, and an electronic interface circuit for converting an output power of said electrical contacts of the coil to a power input of an electronic device.

BRIEF DESCRIPTION OF THE DRAWINGS

The same reference number represents the same element on all drawings.

DETAILED DESCRIPTION OF THE PREFERRED EMBODIMENT

FIGS. 1-6 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
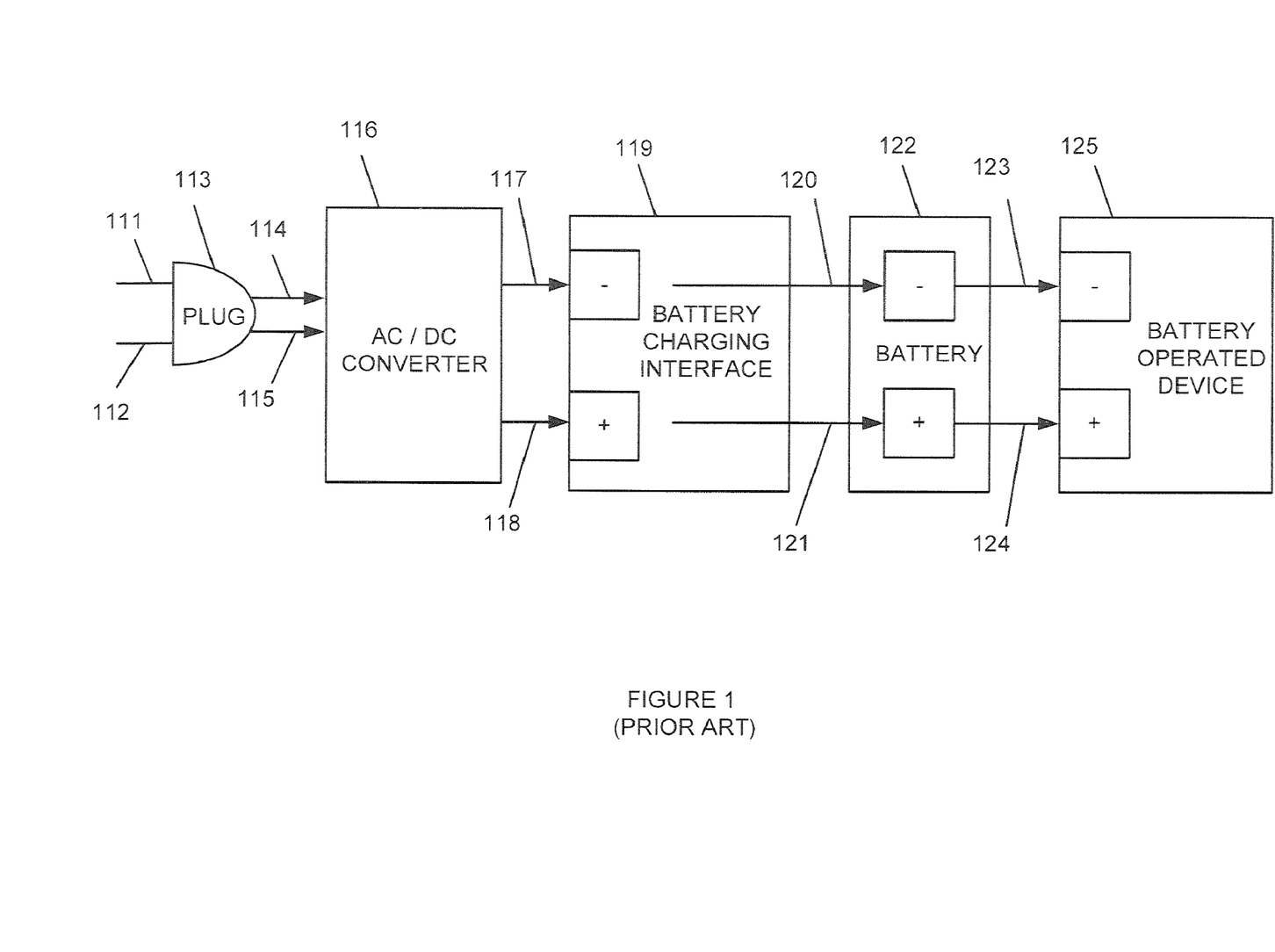
FIG. 1 is a block diagram of conventional charging arrangements for a battery operated device like cell phone.

FIG. 1 illustrates a conventional arrangement for recharging a battery of a battery operated portable device like cell phone. The device receives the power from a primary power outlet like a power socket of a domestic supply line, by using an AC plug 113 with Neutral AC prong 111 and Hot AC prong 112. AC power is fed into an AC/DC converter 116, through the Neutral AC input lead 114 and the Hot AC input lead 115, for conversion into DC. Then, after regulating the output to the desired input voltage through a step down transformer (not shown), the AC/DC converter 116 feeds the rectified and regulated power to the device battery 122 through a battery charging interface 119 for recharging the battery 122 of the battery operated device 125. DC voltage output of the AC/DC converter 116 is fed into the battery charging interface 119 through Negative DC input 117 and Positive DC input 118. The Negative battery charging input 120 and the Positive battery charging input 121 are connected to the respective negative and positive terminals of the battery 122 for charging and the battery power is fed to the device 125 through its Negative battery lead 123 and the Positive battery lead 124.

While this conventional arrangement works well and without any problem for the user when he is located near a primary power source. The situation is otherwise when he is away from such primary power sources, such as when he is on a tour with no power source readily available to recharge the discharged battery of the battery operated device. In such a situation he has to either wait until he arrives at a place where he gets a facility to recharge the battery of his cell phone or to carry spare batteries to meet such exigencies. Failure to recharge the battery of his cell phone during travel may cost him dearly as he may fail to make or receive an important message or call until it is recharged. It is also inconvenient to carry a spare battery apart from the cost factor.

Attempts to solve this problem by use of solar power as an alternative power source to recharge the battery has not been successful as discussed earlier under the related art as the sun to activate the solar cells may not be available to a traveling user and its size itself may stand in the way when the current trend is towards miniaturization of such devices. Emergency recharging units with rechargeable or non-rechargeable batteries (e.g. AA or AAA batteries) available in the market are not convenient or cost effective as also was discussed earlier under the related art.

Accordingly, there was a long felt need to have a portable power source for charging or powering such portable battery operated device that will generate steady power on a continuous basis to charge the device battery or to provide temporary emergency power to the device and also convenient to carry.

The instant invention in its different embodiments provides such a portable power source for a portable battery operated electronic device that is convenient to use and carry and ensures steady power output.

Figure 2:
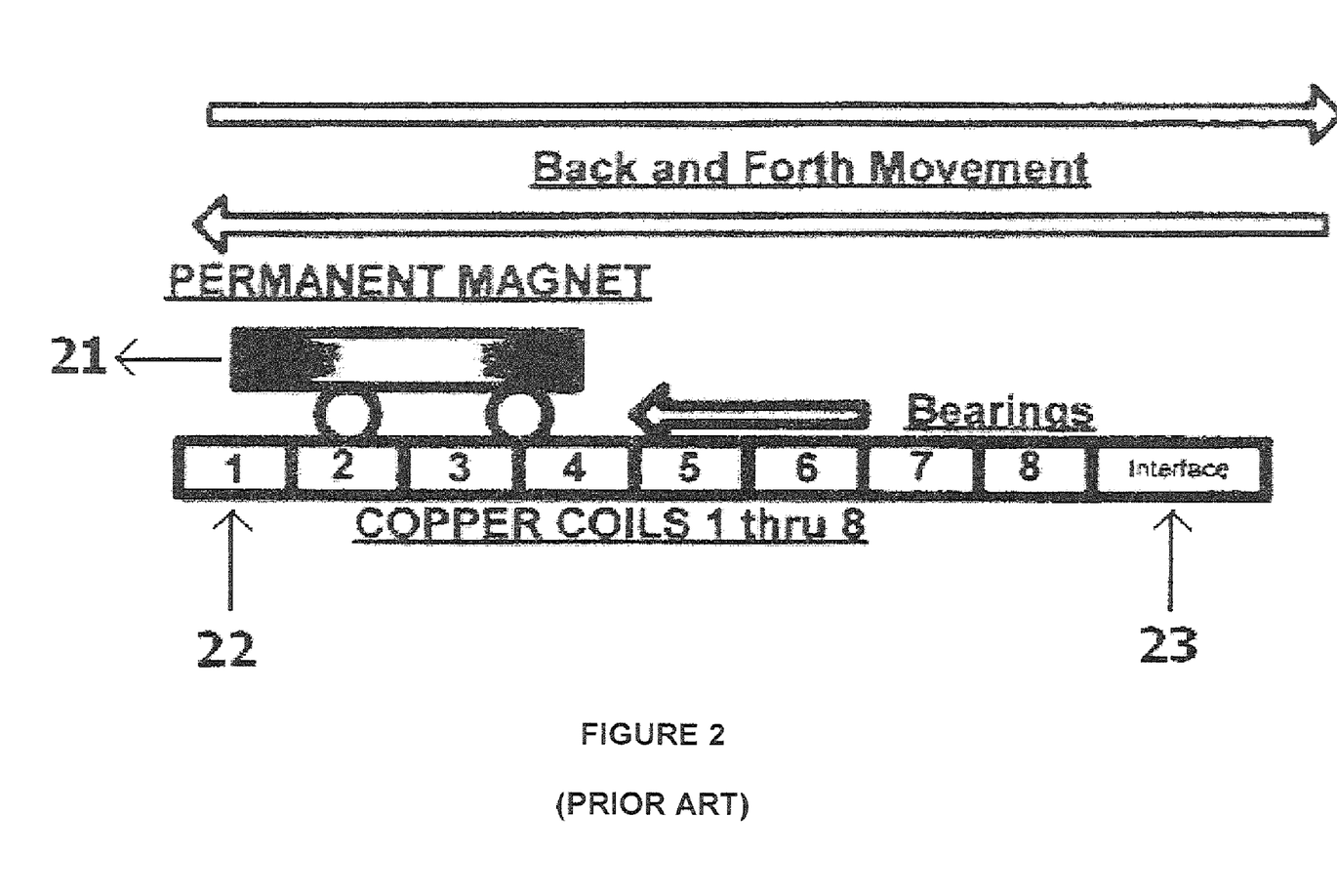
FIG. 2 is a schematic diagram of prior art battery charger disclosed in the U.S. published application with publication number 2006/0139000A1.

As illustrated by FIG. 2, published U.S. patent application (publication No: 2006/0139000A1) provides a wrist worn battery charging system comprising a permanent magnet 21 mounted on a sled adapted to move back and forth on two rails, surrounded by copper coils (1-8) on both sides and attached to an electronic circuitry 23 for outputting the required input power for the device. In contrast to the battery charger shown in FIG. 2, an embodiment of the invention provides a power generator usable as a charger for charging the battery of a battery operated device or to power it directly during emergency need. The power generator of the invention has an induction wire coil and a sliding magnet mounted and sliding on a slide rod located inside the coil to generate power, wherein the slide rod is provided with two magnetic bumpers at its two ends with polarities similar to the facing ends of the sliding magnet and an electronic circuit connected to the leads of coil for outputting the input power for the device in use.

Figure 3:
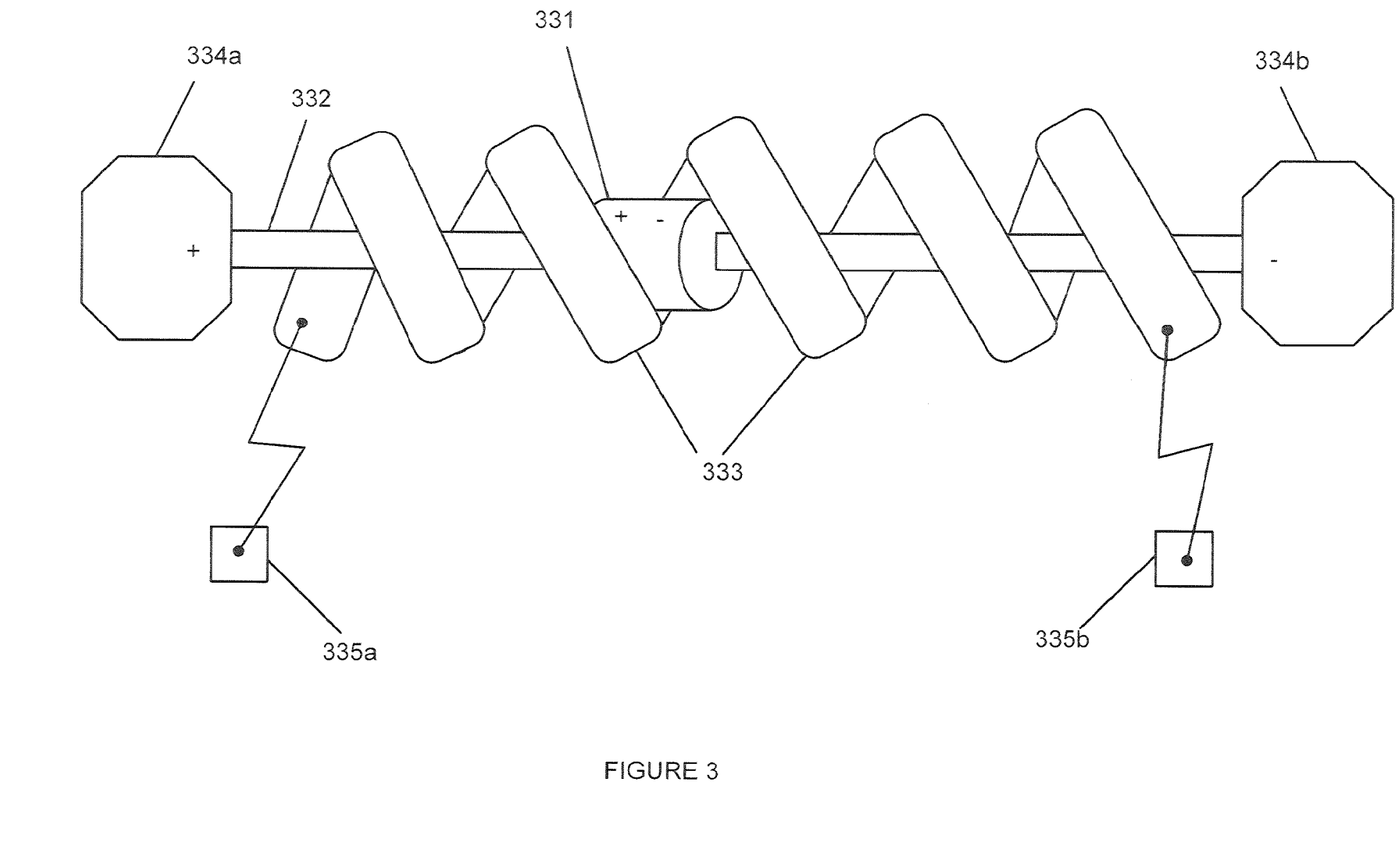
FIG. 3 is a schematic diagram of a power generator according to one embodiment of the invention.

The portable power generator according to said embodiment of the invention is illustrated in FIG. 3 of the drawings. The sliding magnet 331, typically a cylindrical magnet with an axial bore is mounted on the slide rod 332 that slips through its bore hole and is located inside wire coil 333 with the two terminals, connected to coil connection point 1 (335*a*) and coil connection point 2 (335*b*), for connection to the electronic circuit (not shown) to rectify, filter and regulate the output power to the required input power requirement of the device. Two magnetic bumpers 334*a* (positive bumper magnet) and 334*b* (negative bumper magnet) are located at the ends of the slide rod 332 with polarities similar to the polarity of the end of the sliding magnet facing them as shown in FIG. 3.

The power generator with its electronic circuit may be encapsulated or sealed inside a secured enclosure so that it can be easily carried by the user inside his pocket or inside a vehicle. The movement of the person or the vehicle carrying it cause the magnet to slide on the slide rod and each time it reaches the end of the slide rod it is repelled back by the magnetic bumper and it thus gains sufficient momentum to start a motion in the opposite direction. The sliding movement continues as long as its carrier is in motion and the repulsive action of the bumpers helps to maintain the sliding motion of the sliding magnet with the slightest motion of the person or the vehicle carrying it. In fact the strong repulsive force of the magnetic bumpers and momentum imparted by them shall maintain the sliding motion of the magnet for some time even after the carrier (the user or the vehicle) ceases to move.

As a device like a cell phone is typically worn on a waistband or carried in a purse or pocket where they are exposed to constant vibration for long hours, the invention makes the way for the needed electric power to be provided to a charger.

The power generator of the invention may be continuously used to charge a battery or to replace the cell phone battery for a short or emergency call.

The invention provides the concept to harvest energy by converting vibration energy into electrical energy without any significant addition to the weight of a cell phone.

Apart from the simple design of the power generator according to the embodiment of the invention that requires no rail or bearings, the use of two magnetic bumpers gives it an added advantage in terms of efficiency and steady power output.

Figure 4:
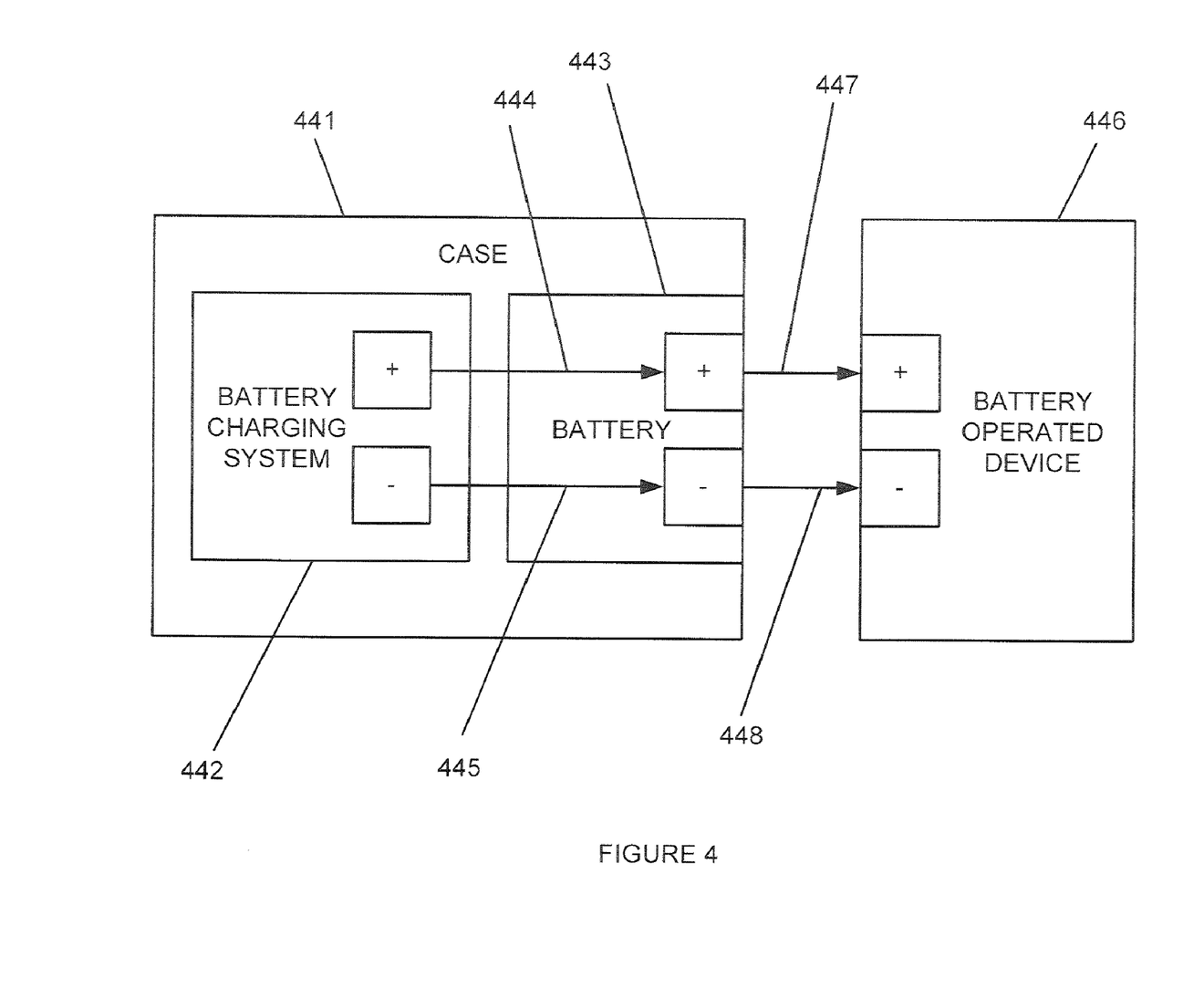
FIG. 4 is a block diagram of a preferred embodiment of the invention with a power generator being used as a battery charging system which is integral to or built in inside the battery operated device.

In one embodiment as illustrated in FIG. 4, the power generator of the invention is used as a battery charging system 442 forming an integral part of the battery operated portable device 446 for which it is meant as a built in charger. The battery charging system 442 is attached internally to the battery 443, both housed in an encapsulating case 441. The battery charging system 442 is suitably interfaced with the positive battery charging lead 444 and the negative battery charging lead 445 of the battery 443. The built in charger can then be attached directly to the battery operated device 446 so as to provide a positive battery voltage supply 447 and a negative battery voltage supply 448 through the device's battery interface.

Figure 5:
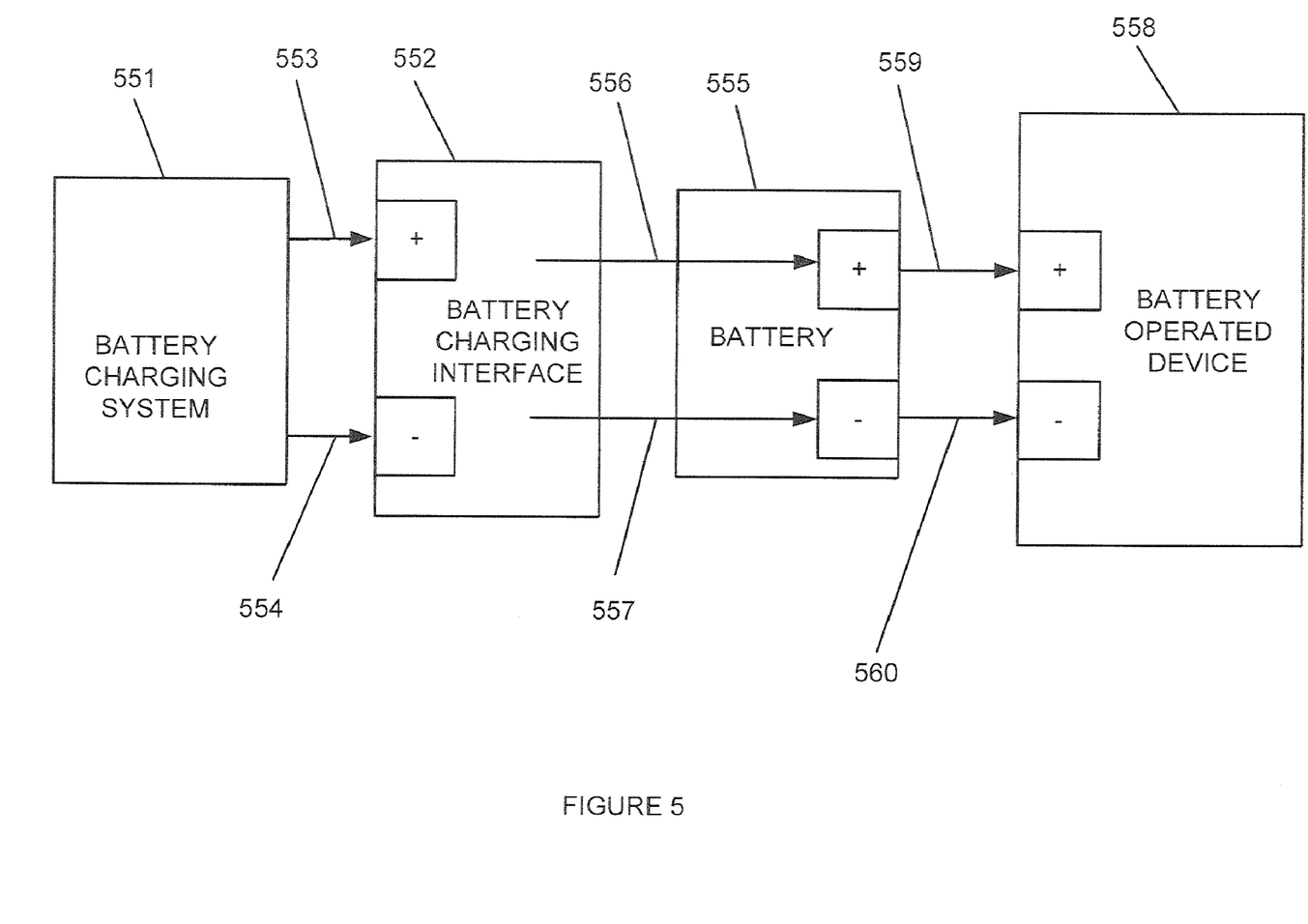
FIG. 5 is a block diagram of an alternative embodiment of the invention with a power generator being used as a battery charging system located outside or external to the battery operated device.

In another embodiment as illustrated in FIG. 5, the power generator of the invention is used as a battery charging system 551 with a battery operated device 558 as an external attachment as and when needed through the battery charging interface 552. The positive charging lead 553 and the negative charging lead 554 of the battery charging system 551 are connected (via the battery charging interface 552) with the positive battery charging lead 556 and negative battery charging lead 557, respectively, of the battery 555 of the battery operated portable device 558, to provide a positive battery voltage supply 559 and a negative battery voltage supply 560 through the device's battery interface.

Figure 6:
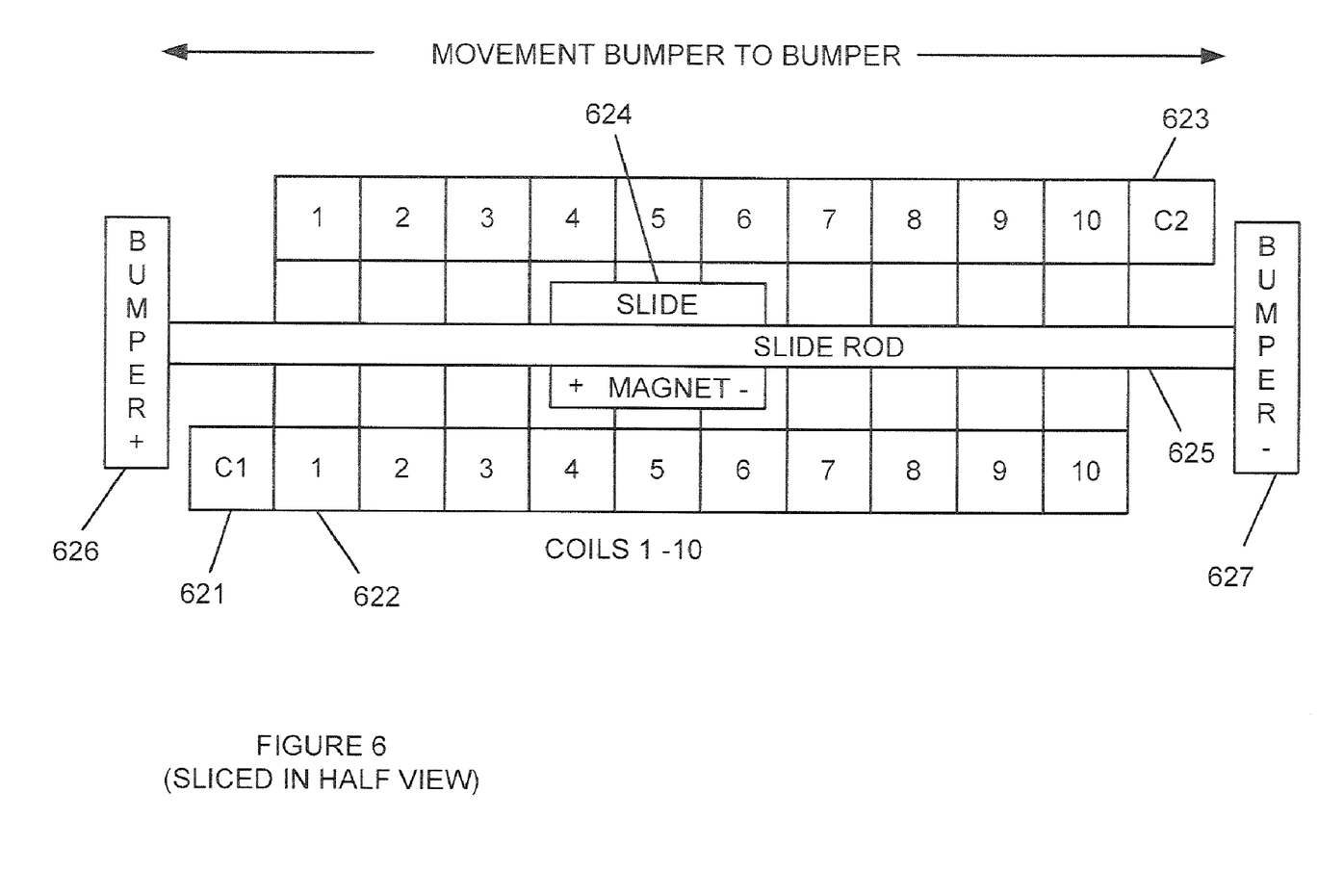
FIG. 6 is a schematic diagram according to another embodiment of the invention showing a power generator with multiple coils connected in series.

The concept of the invention can be extended to an embodiment with multiple coils, as illustrated in FIG. 6 of the drawings. In this embodiment, multiple coils (1-10) of coils 622 are wound around the sliding magnet 624 and the slide rod 625, on which the sliding magnet 624 slides. Two magnetic bumpers 626 (positive bumper magnet) and 627 (negative bumper magnet) are located at the two ends of the slide rod 625 with same polarities of their ends facing the sliding magnet as the polarities of the respective near ends of the sliding magnet 624. The ends of each coil (1-10) are connected in series with two terminals, viz., C1 coil connector 1 (621) and C2 coil connector 2 (623), for establishing electrical contacts with the electronic interface circuit (not shown). The sliding magnet 624 slides from end to end of the slide rod 625, that is the movement of the sliding magnet 624 is from bumper to bumper and thereby generates electric power in respective coils (1-10) during its to and fro movement inside the coils.

In an alternative embodiment the power generator of the invention can also be deployed as the direct power source to activate or run a portable device by adapting this as an alternative power source.

In yet another embodiment, the power generator of the invention, apart from being designed to operate as an external attachment to the device with which it is used, may be regulated to cater to the charging need of a variety of battery operated devices with varying power input requirements, with suitable adaptation of the interface circuit. The sliding magnet is preferably made with lightweight nano-ferromagnetic material. The magnetic bumpers may or may not be nano-ferro magnets though nano-ferromagnetic bumpers are preferred. The induction coil in an embodiment of the invention is a copper coil. The slide rod is preferably made of a non-magnetic material. The electronic interface circuit that connects the power generator to the battery to be charged or the device to be energized may include capacitors to store the energy and diodes that act as rectifiers for conversion of AC input to DC output for connecting to the battery. The circuit may also include transformer to step up or step down the voltage of the power generator to match the input need of the battery-operated device.

The power generator when designed to operate as an external attachment may be suitably attached to the device by means of straps like a leather strap or through a velcro strap for carrying along with the device. The generator can also be separately clipped to the user's pocket or fixed to the user's wrist or waistband to provide the necessary vibratory or oscillatory motion to the moving magnet.

Although the different embodiments of the invention have been described herein with reference to the use of the charger with a cell phone, a person ordinarily skilled in the art can suitably adapt it for use with other portable battery operated devices. While the invention has been particularly shown and described with reference to preferred embodiments, it should be understood by those skilled in the art that various changes in the form and detail may be made therein without departing from the spirit and scope of the invention as defined in the appended claims.

In an advantage, a portable battery charger for recharging the installed battery of a portable battery operated device such as cell phone or to power it directly for a short period that utilizes the concept of harvesting kinetic energy to generate power by using the principles of Faraday's Law of electromagnetic induction. The kinetic energy generated by the movement of the user or his vehicle carrying the charger of the invention is used to vibrate or oscillate a tiny magnet located inside an induction coil to generate electric power. The portable charger enables the user to recharge the battery of the device like cell phone he is carrying or power it directly and complete his task after the charge in the device battery flattens out with no ready power source available to immediately recharge the battery.

Those skilled in the art will appreciate variations from these embodiments that fall within the scope of the invention. Those skilled in the art will appreciate that the features described above can be combined in various ways to form multiple embodiments of the invention. As a result, the invention is not limited to the specific embodiments described above, but only by the claims and their equivalents.

The invention claimed is:

1. A power generator comprising:
a coil having ends connected to electrical contacts;
a magnet mounted on a slide rod surrounded by the coil and having a positive pole and a negative pole and configured to slide between two ends of said slide rod to generate an electrical power in the coil by electromagnetic induction on movement of the magnet inside the coil;
a first magnetic bumper located at a first end of the two ends of the slide rod and having a positive pole facing the positive pole of the magnet and configured to repel the magnet on the movement of the magnet inside the coil;
a second magnetic bumper located at a second end of the two ends of the slide rod and having a negative pole facing the negative pole of the magnet and configured to repel the magnet on the movement of the magnet inside the coil; and
an electronic interface circuit for converting an output power of said electrical contacts of the coil to a power input of an electronic device.

2. The power generator of claim 1 wherein the power input is for directly powering the electronic device.

3. The power generator of claim 1 wherein the power input comprises an input to a battery charging port for recharging a battery module of the electronic device.

4. The power generator of claim 1 wherein the coil comprises an induction wire.

5. The power generator of claim 1, wherein power generator is utilized to directly power the electronic device after a built-in battery is discharged.

6. The power generator of claim 5 wherein the electronic device comprises a one of a cell phone, a personal digital assistant (PDA), a laptop, a MP3 player, or a digital gaming device.

7. The power generator of claim 1, wherein said electronic interface circuit further comprises a transformer to step up or step down an output voltage to match an input power need of the electronic device.

8. The power generator of claim 1, wherein said power generator is contained in a leak proof sealed container.

9. The power generator of claim 1, wherein said power generator is built in as an integral part of the electronic device with which it is used.

10. The power generator of claim 1, wherein said power generator is used as an external attachment to the electronic device.

11. The power generator of claim 1, wherein the electronic interface circuit is adaptable to regulate the output power to the input power need of multiple electronic devices with which it is used.

12. A portable electronic device comprising:
a battery module; and
a power generator coupled to the battery module and comprising:
a coil having ends connected to electrical contacts;
a magnet mounted on a slide rod surrounded by the coil and having a positive pole and a negative pole and configured to slide between two ends of said slide rod to generate an electrical power in the coil by electromagnetic induction on movement of the magnet inside the coil;

a first magnetic bumper located at a first end of the two ends of the slide rod and having a positive pole facing the positive pole of the magnet and configured to repel the magnet on the movement of the magnet inside the coil;

a second magnetic bumper located at a second end of the two ends of the slide rod and having a negative pole facing the negative pole of the magnet and configured to repel the magnet on the movement of the magnet inside the coil; and an electronic interface circuit for converting an output power of said electrical contacts of the coil to a power input of the battery module.

13. The portable electronic device of claim 12 wherein the power input comprises an input to a battery charging port for recharging the battery module.

14. The portable electronic device of claim 12 wherein the power generator is encapsulated within the battery module.

15. The portable electronic device of claim 12, wherein the power generator is utilized to directly power the portable electronic device after the battery module is discharged.

16. The portable electronic device of claim 12 wherein the portable electronic device comprises a one of a cell phone, a personal digital assistant (PDA), a laptop, a MP3 player, or a digital gaming device.

17. The portable electronic device of claim 12 wherein said electronic interface circuit further comprises a transformer to step up or step down an output voltage to match an input power need of the battery operated device.

18. The portable electronic device of claim 12 wherein said power generator is built in as an integral part of the battery module.

19. The portable electronic device of claim 12 wherein said power generator is used as an external attachment to the portable electronic device.

* * * * *